United States Patent [19]
Plewes

[11] 4,247,327
[45] Jan. 27, 1981

[54] ALLOY STRENGTHENING BY HYDRIDATION

[75] Inventor: John T. Plewes, Berkeley Heights, N.J.

[73] Assignee: Bell Telephone Laboratories, Incorporated, Murray Hill, N.J.

[21] Appl. No.: 62,705

[22] Filed: Aug. 1, 1979

[51] Int. Cl.[3] .............................................. C01G 25/00
[52] U.S. Cl. ...................................... 75/153; 148/13.2; 423/641; 423/646
[58] Field of Search .................. 75/153; 423/641-648; 148/120, 13.2

[56] References Cited

U.S. PATENT DOCUMENTS

| | | | |
|---|---|---|---|
| 3,184,835 | 5/1965 | Coxe et al. | 29/182.5 |
| 3,829,552 | 8/1974 | Reed | 423/255 |
| 3,922,180 | 11/1975 | Fuchs et al. | 148/11.5 R |

OTHER PUBLICATIONS

Renner, J. et al., Berichte Der Dunsen Gesellschaff Für Phys.Chemie, 76 (1972) p. 759.
Renner, J. et al., Z. Mettalkde, 63 (5), (1972) 289-294.
Kadel et al., J. Less-Common Metals, 65 (1979) 89.
OFHC Brand Copper—Report, The American Metal Co., Ltd. p. 92-100.

*Primary Examiner*—L. Dewayne Rutledge
*Assistant Examiner*—Upendra Roy
*Attorney, Agent, or Firm*—Peter A. Businger

[57] ABSTRACT

Strengthening and hardening of metallic alloys has formerly been effected by inclusion of various metal and metal oxide additives. According to the invention, alloys having face-centered cubic structure are strengthened and hardened by the inclusion of one or several hydrides which are formed upon interstitial diffusion of hydrogen. Inclusion of hydrogen is conveniently effected in a shaped body of an alloy comprising a first and a second, more easily hydrided component by exposure to a hydrogen atmosphere at elevated temperature.

Resulting alloys also have essentially scale-free surface, high electrical conductivity, and high creep resistance. Hydrided alloys may be shaped, e.g., into electrical components such as wire and switch elements.

3 Claims, No Drawings

ALLOY STRENGTHENING BY HYDRIDATION

TECHNICAL FIELD

The invention is concerned with alloys and their manufacture.

BACKGROUND OF THE INVENTION

It is known that strength and hardness of metallic alloys may be enhanced by dispersions of small amounts of a second phase of metal or of metal oxide additives. For example, it is known that copper may be hardened and strengthened by the addition of cobalt. Similarly, among well-known examples of oxygen containing, dispersion strengthened alloys are Cu-Al and Cu-Si alloys in which Cu is a primary, less easily oxidized component and Al or Si a more easily oxidized additive.

The incorporation of oxides in alloys may be effected by a variety of procedures such as, e.g., by direct reduction, by powder metallurgy, or by internal oxidation. The latter, most recently disclosed process generally calls for the preparation of a body of an alloy containing desired metallic constituents, followed by selective internal oxidation of a more easily oxidized component by oxygen diffusion.

Specific internally oxidized alloys are disclosed in U.S. Pat. No. 3,184,835, issued May 25, 1965 to Charles D. Coxe et al. which discloses single phase alloys consisting of copper as a primary, solvent constituent and beryllium oxide or aluminum oxide as a solute, secondary constituent. Also disclosed are silver alloys in which silver is a solvent and magnesium oxide or aluminum oxide a solute constituent.

In contrast to single phase alloys disclosed by Coxe et al., two-phase oxidation hardened alloys are disclosed in U.S. Pat. No. 3,922,180, issued Nov. 25, 1975 to E. O. Fuchs et al. Particularly disclosed are, e.g., copper, silver, and gold two-phase alloys containing oxides of easily oxidizable metals such as, e.g., Zr, Hf, rare earths, and actinides. Two-phase alloys may be prepared, e.g., from a melt containing an easily oxidizable metal by casting and quenching, by working a solidified body, or by a combination of quenching and working. Internal oxidation of the easily oxidizable component may be effected by heating the resulting body in an oxygen atmosphere. As compared with single phase alloys, oxidation hardened two-phase alloys have superior electrical conductivity; consequently, these alloys are particularly suited for the manufacture of articles such as, e.g., electrical wire, switch contacts, and relay elements. Still, in view of relatively slow, substitutional diffusion of oxygen, there arises a desire for methods which permit reaching desired levels of strength and hardness in shorter time. Moreover, means are desired for strengthening and hardening metal alloys at temperatures more easily reached by heating facilities in commercial use.

SUMMARY OF THE INVENTION

Metallic articles are made from face-centered cubic alloys be internal hydridation of an easily hydrided component. Due to dispersion of hydrides in the matrix, alloys of the invention are strong, hard, and have superior electrical conductivity, creep resistance, and stress relaxation. Hydrided alloys may be shaped, e.g., into electrical components such as wire and switch elements.

Alloys may conveniently be produced by casting from a melt or by powder metallurgy, optional mechanical deformation, and heating in a hydrogen-containing atmosphere at temperatures at which a stable hydride is formed. On account of its solubility, lithium is a preferred easily hydrided component in face-centered cubic elements such as, e.g., Cu, Ag, Au, Al, Ni, and Pb. Among other easily hydrided alloy additives are, e.g., Na, Ca, Sr, and Ba.

DETAILED DESCRIPTION

Alloys of the invention have face-centered cubic structure, a structure which allows for rapid, interstitial diffusion of hydrogen. Production is by hydridation of a precursor alloy which comprises a primary and at least one secondary component having substantially greater thermodynamic affinity to hydrogen than the primary component. The precursor alloy may be produced, e.g., by customary melt practice, by melting at elevated pressure, or by powder metallurgy. Elevated pressure is particularly indicated to prevent the loss of volatile components such as, e.g., lithium in the course of preparing a Cu-Li melt.

Containment of a volatile additive may alternatively be effected by encapsulation inside a body of a primary component. For example, a Cu-Li alloy may be prepared as follows. A hole is drilled into a body of copper and an appropriate amount of lithium is inserted into the hole. The hole is plugged with a fitting body of copper. The resulting lithium-filled body is melted, e.g., in an induction furnace, and preferably in an inert atmosphere such as, e.g., argon or helium. A boron nitride crucible may be conveniently used for melting. The resulting lithium-containing alloy may be cast, thermomechanically processed, and shaped into a desired form.

Further processing of a shaped article is as follows. The shaped article is heated to a temperature not exceeding the dissociation temperature of lithium hydride of approximately 700 degrees C. and exposed to an atmosphere containing a substantial amount of hydrogen. In the interest of adequate kinetics, temperature is preferably at least 400 degrees C. and, for the sake of processing convenience, temperature typically does not exceed 550 degrees C. A more narrow preferred temperature range is from 450 to 500 degrees C. Exposure times vary with temperature, higher temperatures allowing for shorter exposure. Exposure times also depend on article dimensions, bulky articles requiring longer exposure to the hydrogen atmosphere. Temperatures towards the lower end of such range are preferred in the interest of minimizing grain growth and particle size. For example, in the case of Cu-Li, particle size is 1–2 micrometers when temperature is approximately 450 degrees C., 2–3 micrometers when temperature is approximately 500 degrees C., and 6–8 micrometers when temperature is approximately 550 degrees C.

Shaping into a desired form may be, e.g., by plastic deformation either before or after hydridation. In the latter case, temperature during deformation is preferably kept substantially below the dissociation temperature of the hydride. As an additional benefit, an increase in strain hardening rate may be derived by such plastic deformation of the hydrided alloy. Shaping by methods such as, e.g., drilling or lathing are also readily accomplished either before or after hydridation. Hydrided alloys may be shaped, e.g., into electrical components such as wire and switch elements.

Other face-centered cubic alloys such as, e.g., Ag, Au, Al, Ni, and Pb alloys may similarly be strengthened according to the invention by the inclusion of lithium hydride. Among other easily hydrided additives are Ba, Ca, Ce, Na, Sr, and Zr, lithium being preferred, however, on account of its superior solubility and high thermodynamic stability. Easily hydrided additives are preferably employed in amounts of at least 0.5 atomic percent of the alloy and, in the interest of ease of processing, in amounts which are readily dissolved. Heating during hydrogen diffusion is preferably at temperatures not exceeding a temperature of 50 degrees C. below the dissociation temperature of the hydride being formed.

Alloy hydridation results not only in enhanced strength and hardness but also in improved creep resistance. Resulting alloys have scale-free surface and typically are fine grained. Essentially uniform grains measuring approximately 0.01-0.02 millimeters in diameter are typical.

Alloys of the invention may contain, in addition to a primary component and an easily hydrided component, additives as may be effective to develop specific desired properties. However, the presence of impurities such as, in particular, oxygen tends to tie up easily hydrided additives, thereby reducing the volume fraction of hydride in an alloy. Influence of various additives on the properties of copper, e.g., are disclosed in the book, *OFHC Brand Copper,* published by the American Metal Company, Limited, 1957, which specifically mentions elements Bi, C, Cr, Fe, Mn, Ni, O, P, Ag, S, and Te.

EXAMPLE 1.

A body of a Cu-Li alloy containing 0.62 weight percent Li was soaked at a temperature of 700 degrees C. for 30 minutes in a nitrogen atmosphere, cold swaged to result in a 75 percent area reduction, soaked again at 700 degrees C. for 30 minutes in a nitrogen atmosphere, and drawn into 30 mil wire. At this point, electrical conductivity of the drawn wire was measured and found to be a mere 18 percent of conductivity of pure copper. The drawn wire was then heated to 500 degrees C. in a pure hydrogen atmosphere for 17 hours. Conductivity of the hydrogen treated wire was determined to be 62 percent of that of copper.

EXAMPLE 2.

A body of a Cu-Li alloy containing 0.32 weight percent Li was soaked, swaged, soaked again, and drawn into 30 mil wire as described in Example 1. Conductivity of the wire prior to hydridation treatment was 32 percent of that of copper. After heating at 400 degrees C. for 17 hours in pure hydrogen, conductivity was measured to be 74 percent of conductivity of copper.

I claim:

1. Method for producing a shaped metallic article, said method comprising the steps of (1) preparing a body of an alloy comprising a first and a second metallic element and (2) exposing said body to a gaseous ambient while said body is heated CHARACTERIZED in that (a) said alloy is an essentially oxygen-free, face-centered cubic alloy, (b) said first element is Cu and said second element is Li, (c) said gaseous ambient comprises a substantial amount of hydrogen, and (d) said body is heated in said gaseous ambient at a temperature in a range from 400 degrees C. to 700 degrees C., whereby said alloy is strengthened and hardened.

2. Method of claim 1 in which said second element is present in said alloy in an amount of at least 0.5 atomic percent of said alloy.

3. Method of claim 1 in which said body, subsequent to step (d), is shaped by plastic deformation.

* * * * *